(12) United States Patent
Turner

(10) Patent No.: US 12,019,657 B1
(45) Date of Patent: Jun. 25, 2024

(54) APPARATUS AND METHOD FOR HEURISTIC DATA FORECASTING IN HIGH-PACED, LIMITED DATA ENVIRONMENTS

(71) Applicant: EmergIP, LLC, Dover, DE (US)

(72) Inventor: Christopher Turner, Dover, DE (US)

( * ) Notice: Subject to any disclaimer, the term of this patent is extended or adjusted under 35 U.S.C. 154(b) by 0 days.

(21) Appl. No.: 18/236,660

(22) Filed: Aug. 22, 2023

(51) Int. Cl.
| | |
|---|---|
| *G06F 7/02* | (2006.01) |
| *G06F 16/00* | (2019.01) |
| *G06F 16/28* | (2019.01) |
| *G06F 16/951* | (2019.01) |
| G06F 18/24 | (2023.01) |
| G06N 3/09 | (2023.01) |

(52) U.S. Cl.
CPC .......... *G06F 16/287* (2019.01); *G06F 16/951* (2019.01); *G06F 18/24* (2023.01); *G06N 3/09* (2023.01)

(58) Field of Classification Search
CPC ...... G06F 16/287; G06F 16/951; G06F 18/20; G06F 18/24; G06N 3/09
See application file for complete search history.

(56) References Cited

U.S. PATENT DOCUMENTS

| | | | |
|---|---|---|---|
| 10,776,799 B2 | 9/2020 | Moore | |
| 11,361,386 B2 | 6/2022 | Phillips | |
| 11,501,112 B1* | 11/2022 | Oliner | G06F 16/90335 |
| 2017/0084167 A1* | 3/2017 | Bump | G06F 11/079 |
| 2020/0409780 A1* | 12/2020 | Balasubramanian | G06F 9/3838 |
| 2022/0309592 A1 | 9/2022 | Zahora | |
| 2023/0388324 A1* | 11/2023 | Thompson | H04L 63/1416 |

* cited by examiner

*Primary Examiner* — Bruce M Moser
(74) *Attorney, Agent, or Firm* — Caldwell Intellectual Property Law

(57) ABSTRACT

An apparatus for rapid data retrieval and heuristic processing of limited starting input information is disclosed. The apparatus comprises at least a processor and a memory communicatively connected to the at least a processor. The memory instructs the processor to receive ability data as it relates to an entity's ability to execute specified remedial measures, receive emergent incident data which includes the details of the triggering incident, generate an incident remediation profile based on the emergent incident data, generate a remediation resolve profile based on the amalgamation of the entity and ability data and the incident remediation profile, then display the results for a user.

20 Claims, 10 Drawing Sheets

APPARATUS AND METHOD FOR HEURISTIC DATA FORECASTING IN HIGH-PACED, LIMITED DATA ENVIRONMENTS

FIELD OF THE INVENTION

The present invention generally relates to the field of machine-learning. In particular, the present invention is directed to an apparatus and method for probabilistically estimating the remedial measures necessary and the entity's likelihood of executing them as they relate to a compromising incident and the involved entity's historic record.

BACKGROUND

Rapidly evolving situations often force decision-makers to extrapolate the necessary responsive steps, and to formulate alternate options if any of the responsive steps are incompatible with the affiliated entities or equipment and their respective abilities, all in real-time. These types of decisions rely on human comprehension and execution under pressure, with limited resources and information to consider. In some cases, the required input data may exist in adjacent databases, but current infrastructures are incongruent with rapid execution demands. They often rely on phone calls, email exchanges, or formal requests, which all depend on initially identifying the requisite process and the point of contact. In many cases, human lives may depend on these rapid decisions being made correctly.

SUMMARY OF THE DISCLOSURE

In an aspect, an apparatus for rapid data retrieval and heuristic processing of limited starting input information. The apparatus comprises at least a processor and a memory communicatively connected to the at least a processor. The memory instructs the processor to receive ability data as it relates to an entity's ability to execute specified remedial measures, receive emergent incident data which includes the details of the triggering incident, generate an incident remediation profile based on the emergent incident data, generate a remediation resolve profile based on the amalgamation of the entity and ability data and the incident remediation profile, and finally display the results for a user.

In another aspect, a method for rapid data retrieval and heuristic processing of limited starting input information. The method includes receiving, by at least a processor, ability data as it relates to an entity's ability to execute specified remedial measures. The method also includes receiving, by the at least a processor, emergent incident data which includes the details of the triggering incident. The method further includes generating, by the at least a processor, an incident remediation profile based on the emergent incident data. The method continues by generating, by the at least a processor, a remediation resolve profile based on the amalgamation of the entity and ability data and the incident remediation profile. Finally, the method includes displaying, by the at least a processor, the results for a user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for rapid data retrieval and heuristic processing of limited starting input information. The apparatus comprises at least a processor and a memory communicatively connected to the at least a processor. The memory instructs the processor to receive ability data as it relates to an entity's ability to execute specified remedial measures, receive emergent incident data which includes the details of the triggering incident, generate an incident remediation profile based on the emergent incident data, generate a remediation resolve profile based on the amalgamation of the entity and ability data and the incident remediation profile, then display the results for a user.

Figure 1:
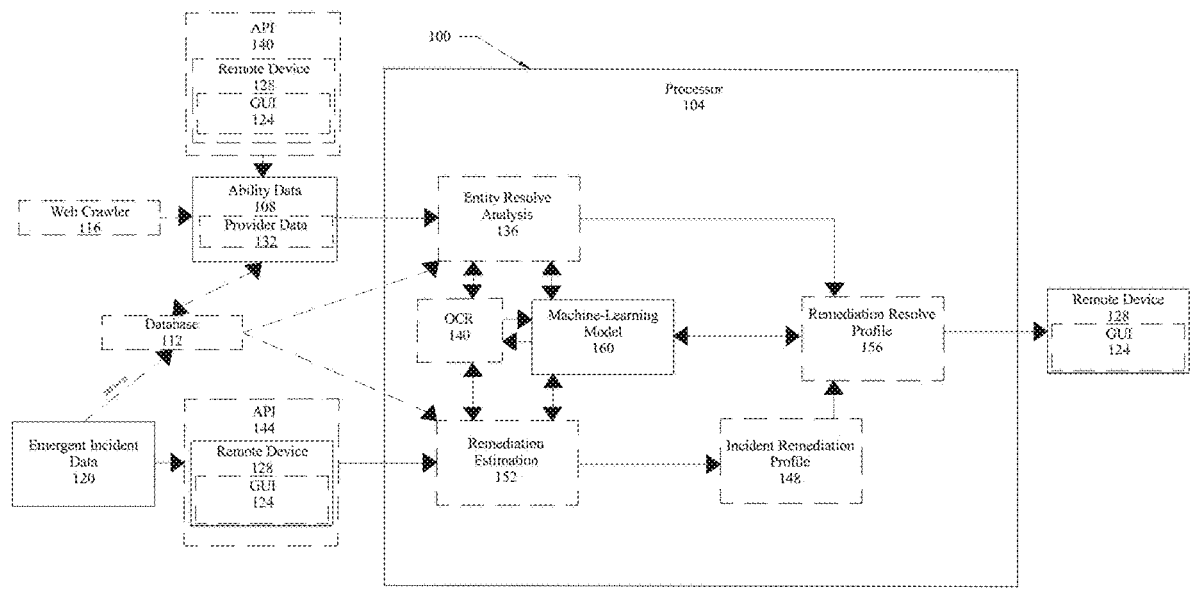
FIG. 1 is a block diagram of an exemplary embodiment of an apparatus for rapid data retrieval and heuristic processing of limited starting input information.

Referring now to FIG. 1, an exemplary embodiment of apparatus 100 for rapid data retrieval and heuristic processing of limited starting input information is illustrated. The apparatus includes a processor 104. Processor 104 may include any computing device as described in this disclosure, including without limitation a microcontroller, microprocessor, digital signal processor (DSP), and/or system on a chip (SoC) as described in this disclosure. The computing device may include, be included in, and/or communicate with a mobile device such as a mobile telephone or smartphone. Processor 104 may include a single computing device operating independently, or may include two or more computing devices operating in concert, in parallel, sequentially, or the like; two or more computing devices may be included together in a single computing device or in two or more computing devices. Processor 104 may interface or communicate with one or more additional devices as described below in further detail via a network interface device. Network interface devices are described in detail below. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable the scalability of apparatus 100 and/or the computing device. Detailed description of a computing device embodiment is described below in reference to FIG. 9.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 is configured to receive a set of ability data 108. For the purposes of this disclosure, "ability data" is a representation of information describing an individual human or piece of equipment and its affiliated capabilities regarding its ability to resolve the confronted incident. In a non-limiting embodiment, ability data 108 may include biological and/or health-related information, patient financial history including but not limited to past medical bill payments made or missed, credit score, bankruptcy records, tax records, work history, driver's license databases, news articles or any other publicly available data relevant to the patient's prospect of compensating any medical service provider for rendered care. Ability data 108 may include additional inputs not traditionally correlated with the immediate incident, but statistically relevant for calculating an accurate probabilistic likelihood of the entity fully resolving the incident and all corrective actions.

With continued reference to FIG. 1, ability data 108 may be received from a database 112. In a non-limiting embodiment, database 112 may include a service provider's previous records of the specified entity's care. These records may include prior services rendered, entity's insurance provider, entity's payment history, timeliness, additional coverages and amounts, as well as any associated exemptions, liabilities, reimbursements, or exceptions, or any other entity capability-related data. Further, database 112 may be a combination of data repositories storing data from any lawfully compliant means, such as a hospital, ambulatory service, insurance provider database, or other medical service that may have billed the patient at any point in history.

With continued reference to FIG. 1, processor 104 is configured to retrieve ability data 108 through the use of a web crawler 116. A "web crawler," as used herein, is a program that systematically browses the internet for the purpose of web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to scrape external ability data 108 from a plurality of credit reporters, government databases, insurance registrations, social media sites, blogs, forums, or any other site with relevant data. The web crawler may be seeded and/or trained with a reputable website to begin the search. A web crawler may be generated by processor 104. In some embodiments, the web crawler may be trained with information received from an external user through a user interface. In some embodiments, the web crawler may be configured to generate a web query. A web query may include search criteria received from a user. For example, a user may submit a plurality of websites for the web crawler to search user data statistics from and correlate to pecuniary user data, educational user data, social user data, and the like. Additionally, the web crawler function may be configured to search for and/or detect one or more data patterns. A "data pattern" as used in this disclosure is any repeating forms of information. A data pattern may include repeating pecuniary strategies, educational strategies, and the like. In some embodiments, the web crawler may be configured to determine the relevancy of a data pattern. Relevancy may be determined by a relevancy score. A relevancy score may be automatically generated by processor 104, received from a machine-learning model described in detail below, and/or received from the user. In some embodiments, a relevancy score may include a range of numerical values that may correspond to a relevancy strength of data received from a web crawler function. As a non-limiting example, web crawler 116 may search the internet for external user data, such as a user's educational data, investment data, pecuniary data, crime data, and the like. Web crawler 116 may search the internet and retrieve any data that may affect the probabilistic likelihood of incident resolution. In another non-limiting embodiment, when the details herein disclosed are used in an emergent medical application in which the user is concerned with the patient's ability to pay the resulting bill, web crawler 116 may search patient's social media profile(s) and find a post where user claims they were cheated by an outrageous medical bill and plans to fight it in court. In this non-limiting embodiment, web crawler 116 may index the post, and may further assess a high relevancy score based on a similar medical procedure and cost being necessary in the current engagement.

With continued reference to FIG. 1, processor 104 is configured to also receive emergent incident data 120. For the purposes of this disclosure, "emergent incident data" is any information aiding in the implementation of a comprehensive corrective action plan. In a non-limiting embodiment again centered around the emergency medicine example, emergent incident data 120 may include any info supporting a diagnosis and treatment of the current ailment.

More specifically, in the case of a car crash, this information would include the time and location of the crash, the incident angle and relative velocity, the apparent injuries, any additional symptoms as described by the victim, and any other relevant incident details. Emergent incident data 120 may further include any of the following personal information: age, height, weight, heart rate, current diagnosis, medical history, allergies, current condition, current symptoms, known disorders, test results (e.g., basic metabolic panel, blood test, other physiological data, and the like), medications, growth chart, family history, medical treatment, and the like. Medical treatment may include medical evaluation, medical diagnosis, prescribing medicines/treatments, providing treatments, therapy, occupational therapy, physical therapy, care given during a hospital stay, surgery, treatment provided by a medical practitioner, and the like. For example, and without limitation, emergent incident data 120 may include information about a current condition such as a reported stomach pain of the patient. Emergent incident data 120 may comprise medical history data. As used in the current disclosure, "medical history" is any data relating to the user's medical care. Medical care may include any part of the attempt to improve the user's health. Emergent incident data 120 may include provider data, medical history, personal information, pre-existing conditions, the physical condition of the user, biometrics of the user, the physical appearance of the user, geographic location of the user, medical transport, distance from hospital, accident history, and the like. Emergent incident data 120 may include past and present injuries or ailments suffered by the user. Emergent incident data 120 may be received by processor 104 via a user input. For example, and without limitation, the user or a third party may manually input emergent incident data 120 using a graphical user interface 124 of processor 104 and/or a remote device 128, such as, for example, a smartphone or laptop. A "graphical user interface (GUI)," as used herein, is a graphical form of user interface that allows users to interact with electronic devices. In some embodiments, GUI 124 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like. In a non-limiting embodiment, remote device 128 may refer to multiple displays used collaterally to ingest, export, or share data across multiple platforms, as in a neural network described in detail below and in FIGS. 5-6.

Still referring to FIG. 1, emergent incident data 120 may implement a geofencing operation wherein the location of the emergent incident is either automatically collected based on the user location being tracked, or it may be manually entered by user at the time of data entry. As used herein, "geofencing" is the process of creating a virtual geographical boundary that triggers a marketing action to a device when user enters or exits that boundary. Herein, marketing action may include updating processor 104 recommendations based on applicable location. Processor 104 may include a component, set of components, or system that enables detection of a location of remote device 128 relative to a map, geographic location, or location within an area; processor 104 may include without limitation a global positioning system (GPS) device, a device that detects position based on cell tower triangulation, and/or one or more components that detect direction or degree of motion, such as accelerometers, gyroscopes, an inertial measurement unit (IMU), or similar devices. In a non-limiting embodiment, an ambulance may rely on the precise GPS location provided by any available remote device, whether communicatively connected to apparatus 100, or manually reproduced within apparatus 100 through an interface which may be provided by remote device 128 or GUI 124. In GPS limited environments, wherein a location cannot be precisely identified, processor 104 may rely on motion-sensing equipment to track and update user position based on inertial accelerations. Additionally, if inertial sensing is unavailable and GPS position is limited or unavailable, apparatus 100 may rely on cellular triangulation to approximate user location. Additionally, remote device 128 and/or apparatus 100 may allow for position sensing based on its proximity to communicably connected devices. In a non-limiting embodiment, remote device 128 connecting to a wifi signal which is only available at a specified location may sufficiently approximate location. Additionally, any proximal relation that can be established to a device with a known location may further enable location identification. For example, a phone synchronized to a laptop via a Bluetooth connection, wherein the laptop is sharing a precise location, may be sufficient for the location identification herein. Once the originating location is logged, it may be used to identify the applicable regulations and ordinances depending on the associated controlling jurisdiction. Jurisdictional boundaries may be manually drawn onto a map based on an informed perspective entity interpreting the boundaries and replicating them onto a digital map which may be distributed or centralized to be usable by all processor 104 devices. Jurisdictional boundaries may also be established through approximated geometric shapes overlayed onto a map. In a non-limiting embodiment, a jurisdictional boundary may be approximated by a rectangular shape with the top of the rectangle replaced by a semi-circle with a radius equal to one half of the rectangle, resulting in a box with a half circle built on top. These types of shape configurations may be used independently or in combination to approximate a bounded area. In an additional, non-limiting embodiment, jurisdictional boundaries may be approximated and used such that the city borders, streets and other tangible landmarks may be used to configure the boundaries. In a non-limiting embodiment, emergent incident data 120 may disclose the location of an individual who succumbed to injuries and passed away while being transported in an ambulance as occurring within the Oakland County, California region, wherein processor 104 would then identify Oakland County as the governing jurisdiction and recommend the lawfully compliant disposition based on associated municipal ordinance and state laws, which in this case, may direct user to procedures contained within § 8.9 of the Oakland County Medical Control Authority System. Jurisdiction identification may be accomplished through web interfaced queries of governing jurisdictions, or it may be accomplished by a stored map with jurisdictional boundaries built in. Jurisdiction identification may further incorporate the use of machine-learning processes using prior jurisdiction identifications as training data and able to rely on any of the aforementioned methods to precisely locate remote device 128 and the affiliated emergent incident. Additionally, emergent incident data 120 may enable recommendations based on obligatory charging procedures dependent on the locality. In a non-limiting embodiment, emergent incident data 120 may identify that the current jurisdiction obligates the local government to reimburse for transportation of deceased subjects, wherein processor 104 would rely on this information in its remediation recommendations. As described above, the proper identification of a precise location enables a web-enabled device to then query the local jurisdictional attributes. Additionally, a locally stored database may also enable apparatus 100 to assess the local applicable statutes and regulations once a precise location is identified. Once location is identified, usually within emergent incident data 120. Remediation estimation 152 may then convert that data to a machine-readable model. That machine-readable model may then identify the corrective actions likely to be necessary, as well as the probabilities associated with each. In the case of a patient who passes away while in ambulatory transit, incident remediation profile 148 may recommend delivering the corpse to the hospital, or it may recommend going directly to a morgue, or to coordinate with family to identify a funeral home and go directly there. Remediation resolve profile 156 may then combine the jurisdictional guidance of disposing of a corpse with the specific patient and family's ability to financially cover each of the probable destinations. In the case of delivery to a hospital or morgue, remediation resolve profile 156 would likely recommend immediate transit with no financial inhibitions since those costs are typically government absorbed costs. In the case of a direct funeral home delivery, remediation resolve profile 156 may recommend a specific funeral home based on cost reimbursement likelihood from patient's family or may recommend a funeral home known to take full responsibility of coordinating payment through the family with no added input required from the ambulatory service.

Still referring to FIG. 1, emergent incident data 120 may additionally be generated via the answer to a series of questions. The series of questions may be implemented using a chatbot, as described herein below. A chatbot may be configured to generate questions regarding the user's current ailments, past ailments, medical history, family medical history, and the like. In a non-limiting embodiment, a user may be prompted to input specific information or may fill out a questionnaire. In an embodiment, GUI 124 may display a series of questions to prompt a user for information pertaining to emergent incident data 120. As a further example, chatbot may display a list of possible conditions to user, from which user may select each applicable condition the user currently suffers from. In a non-limiting embodiment, processor 104 may receive user selection of a user autoimmune disorder and select additional autoimmune disorders as a function of the user selection. In another example, and without limitation, a medical professional may input emergent incident data 120 using GUI 124 and/or remote device 128. In another example, and without limitation, a third party, such as a different medical entity or healthcare provider, may transmit information of emergent incident data 120 to processor 104. Emergent incident data 120 may be directly input into processor 104. Emergent incident data 120 may be transmitted to processor 104, such as via a wired or wireless communication, as previously discussed in this disclosure. Emergent incident data 120 may be retrieved from multiple sources including clinical reports, available medical facility records, or insurance databases to aid in the rendered medical service. Emergent incident data 120 may be placed through an encryption process for security purposes. This may additionally include storing emergent incident data 120 on an immutable sequential listing as described herein below. Further explanation of chatbot operations is described herein below and referenced in FIG. 7 below.

With continued reference to FIG. 1, ability data 108 may include provider data 132, or any other commonly used characterizations of an entity's ability to resolve an incident. In the continued non-limiting embodiment of a medical service provider treating a car crash victim and relying on the apparatus and method of this disclosure to assess the victim's likelihood of reimbursement, provider data would include the victim's insurance plan and claim limitations. As used in the current disclosure, "provider data" is any element of data related to the health insurance of the user. Health insurance or medical insurance is a type of insurance that covers the whole or a part of the risk of a person incurring medical expenses. Health insurance may include Medicare and Medicaid. Provider data 132 may include the health insurance provider, policy number, deductible information, premium, co-payments, coinsurance, exclusions, coverage limits, out-of-pocket maximum, formulary, a list of prior authorizations, vision insurance, dental insurance, and the like. Provider data 132 may include the identification of a primary insurance provider and a secondary insurance provider. Provider data 132 may include a list of medical facilities that are in-network. In a non-limiting example, provider data 132 may provide an indication of which procedures and types of procedures are covered by the health insurance of the user. Provider data 132 may include an indication of the type of health insurance a user has. Types of health insurance may include Health maintenance organizations (HMOs), Preferred provider organizations (PPOs), Exclusive provider organizations (EPOs), Point-of-service (POS) plans, High-deductible health plans (HDHPs), health savings accounts (HSAs), Indemnity plans, Children's Health Insurance Program (CHIP), the absence of health insurance, and coverage details regarding each. Provider data 132 may additionally comprise a listing of a payer code, wherein a payer code is an alphanumeric code that represents the identity of the health insurer. Provider data 132 may include payer rules and policies associated with the health insurer. Payer policies may be used to support coverage decisions and explain reimbursement for health care services to patients who are covered by provider data 132. These policies outline whether a medical facility or a medical provider is in-network versus out-of-network as well as how much is covered by insurance for things like office visits, surgical procedures, prescriptions, etc.

With continued reference to FIG. 1, processor 104 converts ability data 108 to a machine-readable summary of the entity's ability and likelihood of fully resolving the affiliated incident, as described in emergent incident data 120; this may be performed after the processor processes the ability data; this may be performed, for instance and without limitation, using an entity resolve analysis 136 routine. Entity resolve analysis 136 may rely on machine-learning, as described in detail below, to incorporate alternate spellings or aliases used by entity, and may additionally search based on image or text recognition to maximally collect the relevant entity information. Entity resolve analysis 136 may anticipate missing data locations and assume results in certain situations where a probabilistic analysis may lead to a likely result and save subsequent processing and development effort. This type of forward-looking approximation may rely on machine-learning as discussed in detail below. Processor 104 compiles all relevant analyses and summarizes entity's probabilistic evaluation of whether entity will resolve the referenced emergent incident, which is agnostic to any specific remedy or complexity involved. In a continued non-limiting embodiment, entity resolve analysis 136 may model the car crash victim's entire financial repertoire. Entity resolve analysis 136 may build associations between crash victim and victim's likelihood to reimburse medical providers based on previous emergency ambulance transportations, prior emergency technician bills, hospital discharge records, prior insurance coverage usages, and may even include victim's prior use of crowdsourcing to pay bills, social media posts, or related news articles. Entity resolve analysis 136 may also identify gaps in information or discontinuities to factor into its repayment likelihood analysis. Entity resolve analysis 136 may then generate a likelihood of reimbursement that is scalable and applicable to a range of specific costs and treatment plans. In this non-limiting embodiment, entity resolve analysis 136 may assess a certain patient as being in the middle class, having below average insurance, paying their bills on time, and having an above average credit score. Based on that overview, entity resolve analysis 136 may generate a prospect of repayment as highly likely up to $12,000, moderately likely from $12,000 to $25,000, then unlikely for any charges over $25,000 which are not covered by patient's insurance. Further, entity resolve analysis 136 may identify the specific procedures, prescriptions, and costs that patient's insurance will cover if available from provider data 132 or some other source. Entity resolve analysis 136 may then specify the procedures covered, likely covered, and not covered by patient's insurance to generate a more comprehensive payment probability outlook flexible enough to account for a multitude of treatment plans. Entity resolve analysis 136 may rely on fuzzy set analyses to correlate the input data from ability data 108 with most likely potential results. Fuzzy sets are described in detail below, and in reference to FIG. 3. The predictive and functional elements described herein may implemented, without limitation, as described in U.S. patent application Ser. No. 18/141,725, filed on May 1, 2023, titled "APPARATUS AND A METHOD FOR THE GENERATION OF PROVIDER DATA," which is incorporated by reference herein in its entirety.

With continued reference to FIG. 1 and continuing within the medical service provider embodiment proposed above, processor 104 may be configured to extract user data from at least a medical record. As used in the current disclosure, a "medical record" is a document that contains information regarding medical treatment that has been administered to the user. Medical records may include user credentials, reports, hospital records, clinical reports, available medical facility records, insurance databases, driver's license databases, news articles, social media profiles and/or posts, and the like. Medical records may be identified using a web crawler. Medical records may include a variety of types of "notes" entered over time by healthcare professionals, recording observations and administration of drugs and therapies, orders for the administration of drugs and therapies, test results, x-rays, reports, and the like. Medical records have traditionally been compiled and maintained by healthcare providers, but advances in online data storage have led to the development of personal health records (PHR) that are maintained by patients themselves, often on third-party websites. A medical record may identify the patient and contain information regarding the patient's case history at a healthcare provider. Medical records may be converted into machine-encoded text using an optical character reader (OCR) 140. Medical record data may be incorporated into entity and ability data 108, incident remediation profile, or both as applicable.

Still referring to FIG. 1, in some embodiments, OCR 140 may include automatic conversion of images of written (e.g., typed, handwritten, or printed text) into machine-encoded text. In some cases, recognition of at least a keyword from an image component may include one or more processes, including without limitation OCR, optical word recognition, intelligent character recognition, intelligent word recognition, and the like. In some cases, OCR 140 may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes described in detail below. In some cases, intelligent word recognition (IWR) may recognize written text, one word at a time, for instance by employing machine-learning processes.

Still referring to FIG. 1, in some cases OCR 140 may be an "offline" process, which analyzes a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR 140 may employ pre-processing of image component. Pre-processing may include without limitation de-skew, de-speckle, binarization, line removal, layout analysis or "zoning," line and word detection, script recognition, character isolation or "segmentation," and normalization. In some cases, a de-skew process may include applying a transform (e.g., holography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example character-based OCR algorithms. In some cases, a normalization process may normalize the aspect ratio and/or scale of image component.

Still referring to FIG. 1, in some embodiments OCR 140 will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, OCR 140 may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, a machine-learning process like nearest neighbor classifiers (e.g., k-nearest neighbors algorithm) described in detail below, may be used to compare image features with stored glyph features and choose a nearest match. OCR 140 may employ any machine-learning process described in this disclosure, for example machine-learning processes described with reference to FIG. 4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR 140 may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. Development of OCRopus is led by German Research Centre for Artificial Intelligence in Kaiserslautern, Germany. In some cases, OCR software may employ neural networks, for example neural networks as taught in reference to FIGS. 5-6.

Still referring to FIG. 1, in some cases, OCR 140 may include post-processing. For example, OCR 140 accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 may receive ability data 108 from a third-party source using an application programming interface (API) 144. As used in the current disclosure, an "application programming interface" is a way for two or more computer programs to communicate with each other. API 144 may be a type of software interface, offering a service to other pieces of software. In contrast to a user interface, which connects a computer to a person, an API 144 may connect computers or pieces of software to each other. API 144 may not be intended to be used directly by a person (the end user) other than a computer programmer who is incorporating it into the software. API 144 may be made up of different parts which act as tools or services that are available to the programmer. A program or a programmer that uses one of these parts is said to call that portion of API 144. The calls that make up API 144 are also known as subroutines, methods, requests, or endpoints. API 144 specification may define these calls, meaning that it explains how to use or implement them. One purpose of API 144 may be to hide the internal details of how a system works, exposing only those parts a programmer will find useful and keeping them consistent even if the internal details later change. API 144 may be custom-built for a particular pair of systems, or it may be a shared standard allowing interoperability among many systems. The term API may be used to refer to web APIs, which allow communication between computers that are joined by the internet. API 144 may be configured to query for web applications in order to retrieve emergent incident data 120 or ability data 108 from another web application, database, insurance provider, creditor database, medical center patient portal, hospital system, emergency healthcare provider, and the like. API 144 may be further configured to filter through web applications according to a filter criterion. In this disclosure, "filter criteria" are conditions the web applications must fulfill in order to qualify for API 144. Web applications may be filtered based on these filter criteria. Filter criteria may include, without limitation, types of medical facilities, location of the medical facility, user attendance at the medical facility, user attendance dates at the medical facility, and the like.

With continued reference to FIG. 1, processor 104 may identify an incident remediation profile 148 as a function of emergent incident data 120. As used in the current disclosure, "incident remediation profile" is data structure that represents a summary of predicted necessary or recommended corrective actions relating to emergent incident. In the continued non-limiting embodiment of a medical service provider assessing a crash victim's reimbursement probability, incident remediation profile 148 predicts the most likely cost-accruing medical expenditures to be applied to patient based on emergent incident data 120. Incident remediation profile 148 may rely on a remediation estimation 152 routine within processor 104 to generate the estimated expenditures and associated probabilities. Remediation estimation 152 may operate as an incident resolution classifier and may rely on machine-learning model and historical data to generate incident remediation profile 148. Incident remediation profile 148 may include a plurality of procedure data or sets of procedures for which the cost is estimated within remediation estimation 152 routine based on classifiers and pattern recognition within available historical data. As used in the current disclosure, "procedure data" is any information regarding the treatment the user receives while at the facility. In an embodiment, procedure data may include the cost of the procedure incurred by the user or by the insurance provider. Procedure data may include the type of treatment, length of stay in the medical facility, cost of the procedure, cost of equipment used, and the like. Procedure data may be given in the form of an itemized medical bill. An itemized medical bill may compile each charge incurred by the user during their time at the medical facility. Procedure data may additionally include the cost of medical transportation such as non-emergency transportation and emergency transportation. Medical transportation may include ambulatory services, wheelchair services, stretcher flight services, medical couriers, basic life support transportation, advanced life support transportation, critical care transport, and neonatal intensive care transport.

With continued reference to FIG. 1, incident remediation profile 148 may include an assessment of a probability for each identified corrective action based on the predicted likelihood of that action being necessary. In the continuing non-limiting embodiment of a car crash victim, this probability may be based on common treatment plans for certain ailments, hospital or specific doctor affinities for certain elections, patient history as described within emergent incident data 120, or any other source available to assist in estimating the likelihood of certain treatment plans. Incident remediation profile 148 may summarize the probabilities of the various treatment plans and the affiliated costs. In cases where a procedure or medicine may be optional or discretionary, incident remediation profile 148 may append a descriptor to label it as such. The use of discretionary or optional labels is discussed in detail below. 3

With continued reference to FIG. 1, remediation estimation 152 may rely on machine-learning model and associated training data to generate incident remediation profile 148. Training data may be sourced from multiple points. Initially, with limited to no historical data to rely on, user may be left to manually input significant feedback to calibrate processor's 104 generation of incident remediation profile 148. In a non-limiting embodiment, machine-learning model 160 may rely on an internet-based medical diagnosis and treatment summary search result to build incident remediation profile 148. In a separate embodiment, machine-learning model 160 may ingest historical databases of past patient treatments to approximate future treatment strategies. Reliance on historical databases enables very specific and unique instances to be learned from early on rather than waiting for the specific case type to reoccur and be usable within machine-learning model 160. If web search is unavailable or fruitless, and no historical data is available to teach machine-learning model 160 on the specific emergent incident data 120, user may provide feedback through GUI 124 in response to each output, summary, or recommendation. In a non-limiting embodiment, emergent incident data 120 may contain symptoms of an appendix rupture, but machine-learning model's 160 lack of experience or resources may generate incident remediation profile 148 built exclusively around food poisoning. User may select the summary, trace the reasoning to an inaccurate analysis of overlapping symptoms, then selecting that portion of the output to feed back its inaccurate status. In the example, user would select the specific portions of emergent incident data 120 that should have directed the appendicitis summary and isolate any external symptoms to ensure machine-learning model 160 is associating correct inputs with actual outputs. As this process occurs over time, machine-learning model will more accurately classify input data in emergent incident data 120 to correct remediation strategies. Remediation estimation 152 may retain these classifier dependencies and refine them as machine-learning model 160 expands its comprehension.

With continued reference to FIG. 1, incident remediation profile 148 may incorporate a decision tree type of flow, wherein multiple potential remedies may share similar probabilistic likelihoods, but be mutually exclusive from each other, incident remediation profile 148 may break each remedy into distinct branches. As described above, development of incident remediation profile 148 relies on machine-learning model 160 to predict likely outcomes based on the input data within emergent incident data 120. As machine-learning model 160 grows, it will further refine incident remediation profile 148 and the enclosed data such that each branch of decision tree will be accompanied by a probability and a subordinate network of branches, each with their own probability. In a non-limiting embodiment, and continuing with the appendicitis example above, incident remediation profile 148 may assess a 70% likelihood of appendicitis, a 20% likelihood of food poisoning, 5% likelihood of kidney stones, and 5% combined likelihood of a multitude of other potential diagnoses. Within each of those primary diagnoses, incident remediation profile may build out subordinate branches of remedial actions necessary to resolve the ailment. In the case of kidney stones, incident remediation profile 148 may include a branch built around naturally passing the stones, but potentially monitored with pain medications. It may also include a separate branch requiring invasive surgery, wherein the branch may further split off into sub-branches outlining the decisions that may become necessary for that type of invasive surgery and the subsequent remedial activities. Additionally, remediation estimation 152 may identify a set of potential remedies, but not contain sufficient data to build out sub-branches for each identified remedy. In that case, machine-learning model 160 may indicate the lack of training data for the diagnosis or remedy to user, wherein user may ignore or choose to provide training data which would inform machine-learning model 160 on the specific topic. Decision tree may generate nodes based on remediation estimation 152 classifiers, or may rely on fuzzy set comparison, as discussed in detail below, to correlate input data to likely remediation activities.

With continued reference to FIG. 1, processor 104 may combine the summary from entity resolve analysis 136 and incident remediation profile 148 to generate a remediation resolve profile 156 which summarizes the overall likelihood of complete resolution for the specified incident. Remediation resolve profile 156 may rely on machine-learning model to combine the probable corrective actions with entity's likelihood of completing them. In a non-limiting embodiment, remediation resolve profile 156 may compile every potential expenditure with the itemized burden or cost and the probability of execution of each collocated with the item. Remediation resolve profile 156 may further organize the itemized costs to correlate associated procedures. For example, if a cast is applied below the waist, a set of crutches may become significantly more probable, and so those two items may be grouped together for display convenience. Furthermore, for a set of presented emergency medical symptoms, having a high probability of being diagnosed as one of a small set of illnesses, each specified illness and the affiliated treatment plan may be grouped separately, even when the different illnesses have overlapping treatments. Combining entity resolve analysis 136 with incident remediation profile 148 may involve further classifier use, decision tree operations or fuzzy set analyses. In a non-limiting embodiment, fuzzy set pairing may be appropriate when ability data 108 indicates a natural ability categorization. More specifically, ability data 108 may reveal a set of abilities that resolve an incident rapidly, but at high cost. Ability data 108 may further include abilities that fit into a medium category and a slow, but cost-efficient categories. Use of fuzzy sets may identify these overlapping convergence speed categories and optimize recommendations within remediation resolve profile 156 based on user strategy datum selection for whether cost, timing, or some other priority is paramount. In a separate, non-limiting embodiment, ability data 108 may be categorized by fuzzy set analysis into available equipment bundles. As incident remediation profile designates the likely remedies, remediation resolve profile would compare those remedies to the fuzzy set available equipment bundles, which may reveal that certain remedies are extremely difficult or outright nonviable based on the available resources disclosed in ability data 108. Organization and grouping mechanisms may be managed and refined by machine-learning model described in detail below. Inferences, biases, and coefficients used in these analyses may be tuned using machine-learning.

With continued reference to FIG. 1 and continuing within the medical service provider embodiment proposed above, remediation resolve profile 156 may generate a set of cost-based recommendations. Certain medical procedures are obligatory and essential when certain symptoms are presented. For those mandatory treatments, remediation resolve profile 156 may indicate the obligatory status by tagging the item as such. Outside of these obligatory treatments, many of the medical decisions are at the combined discretion of the patient and the medical team. While not meant to affect a medical professional's discretion in deciding the best care path for the patient, readily available, cost-based recommendations allow both the patient and the care provider to make informed decisions about the most appropriate path. In some cases, this may lead to a fiscally responsible patient electing to forego a discretionary, but costly procedure. In some cases, a service provider may be more comfortable proceeding with a discretionary remedy based on entity resolve analysis 136 displaying a high likelihood of cost recovery.

With continued reference to FIG. 1, remediation resolve profile 156 may generate a display on remote device 128 summarizing the assessment in a human-readable format. As used in the current disclosure, a "remote device" is a device that is used to display a content processor 104. A remote device may include a user interface. A "user interface," as used herein, is a means by which a user and a computer system interact; for example through the use of input devices and software. A user interface may include a GUI, command line interface (CLI), menu-driven user interface, touch user interface, voice user interface (VUI), form-based user interface, any combination thereof and the like. A user interface may include a smartphone, smart tablet, desktop, or laptop operated by the user. This display may be viewable through remote device 128. The data may be interacted with through GUI 124. Within GUI 124, processor 104 may configure the display to show a summary of the most probable cost-driving procedures. Within that summary, GUI 124 may enable user to interrogate each feature to display the specific probability assessment for each itemized corrective action. GUI 124 may further enable user to display the data source leading to the assessment. GUI 124 may enable a user to provide feedback on any of the displayed data. This feedback may then be incorporated as training data to refine machine-learning model 160. This process is discussed in detail below. GUI 124 may enable user to configure the display such that specific types of data or reasoning are prioritized and placed in accordance with user preferences. Further, GUI 124 may enable user to input ability data 108 and emergent incident data 120 directly for use by processor 104. This type of data entry may be accurate and intended for real-world application, or it may be hypothetical data used only to provide direct feedback on a specific scenario where user wants a certain outcome. User may provide feedback through GUI 124 on the hypothetical data to promote or suppress certain probabilities, costs, analyses or recommendations within machine-learning model 160.

Figure 2A:
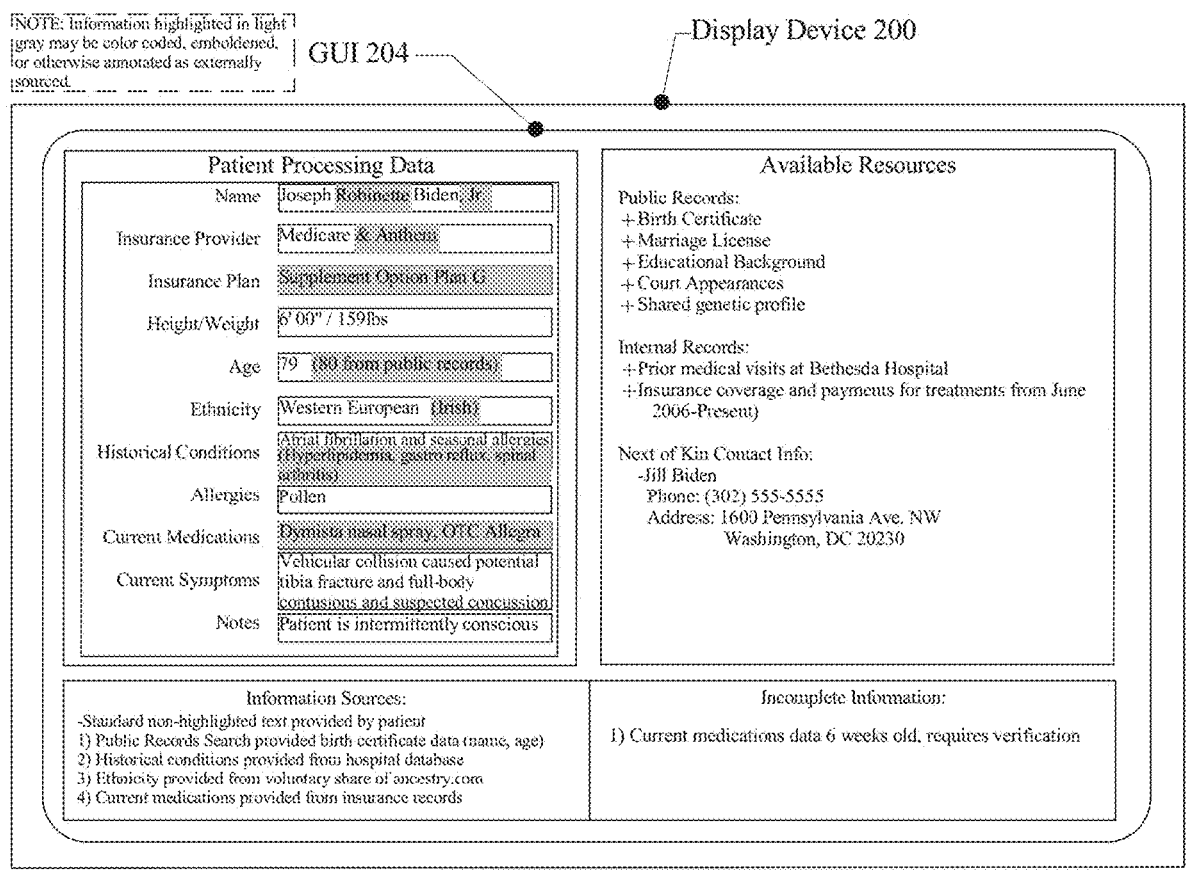
FIG. 2A is an illustration of an exemplary embodiment of a graphical user interface.

Referring now to FIG. 2A, an exemplary non-limiting embodiment of an illustration of display device 200 and GUI 204 display is shown. Display device 200, as described above, is shown displaying GUI 204. Example data shown may be reconfigured as directed by user, or as machine-learning model deems best fit for the information at hand. As shown, interpolated information currently based on external sources is highlighted in light gray. This method of underscoring non-entity sourced information may be exchanged for color coding, bolding, or any other method to visually distinguish the data. All non-entity sourced information may be queried by user to reveal the source and reliability of the information. Where available, this type of click querying may display the source document being relied upon (e.g. birth certificate, marriage certificate, diploma, social media post, etc.). As shown in FIG. 2A, user may establish a layout wherein patient processing data is displayed in a section on the upper-left corner which displays the initial processing information required to begin any type of treatment. This data may include name, insurance information, physical attributes, historic medical conditions including allergies, current medications, symptoms and any additional notes. The displayed fields may be modified to further include or remove information as best applied to the user; user may enter a command to select fields to display, which may be generated automatically based on the command. User may display the sources identified by apparatus and processor such that the available resources are displayed in the top right, then the specific information retrieved from those resources and how it is used may be explained within a window on the bottom left. User may additionally choose to display the outstanding required information in a window on the bottom right to support completing the patient profile quickly when the missing information becomes available, whether through patient verbal communication, next of kin briefing, or some other available, but not yet identified resource. Alternatively or additionally, display fields may be generated or removed based on output of processes described in this disclosure; for instance, categories of data describing categories of emergent situations, one or more data to which user data, emergent situation data or the like may be classified, one or more fuzzy sets, or any other data structures generated according to and/or linked to any such data may be further associated with one or more labels of display fields, which computing device and/or apparatus may generate based on such associations. Thus, display may modify which fields are displayed as well as the content thereof based on results of other processes and/or other data structures as described in this disclosure. All location-based information displayed may be generated by the location sensing abilities contained within remote device 128 and built by processor 104 based on a compilation of a combination of web-based sources, proprietary generated data, and/or manually input details from the current or past engagements.

Figure 2B:
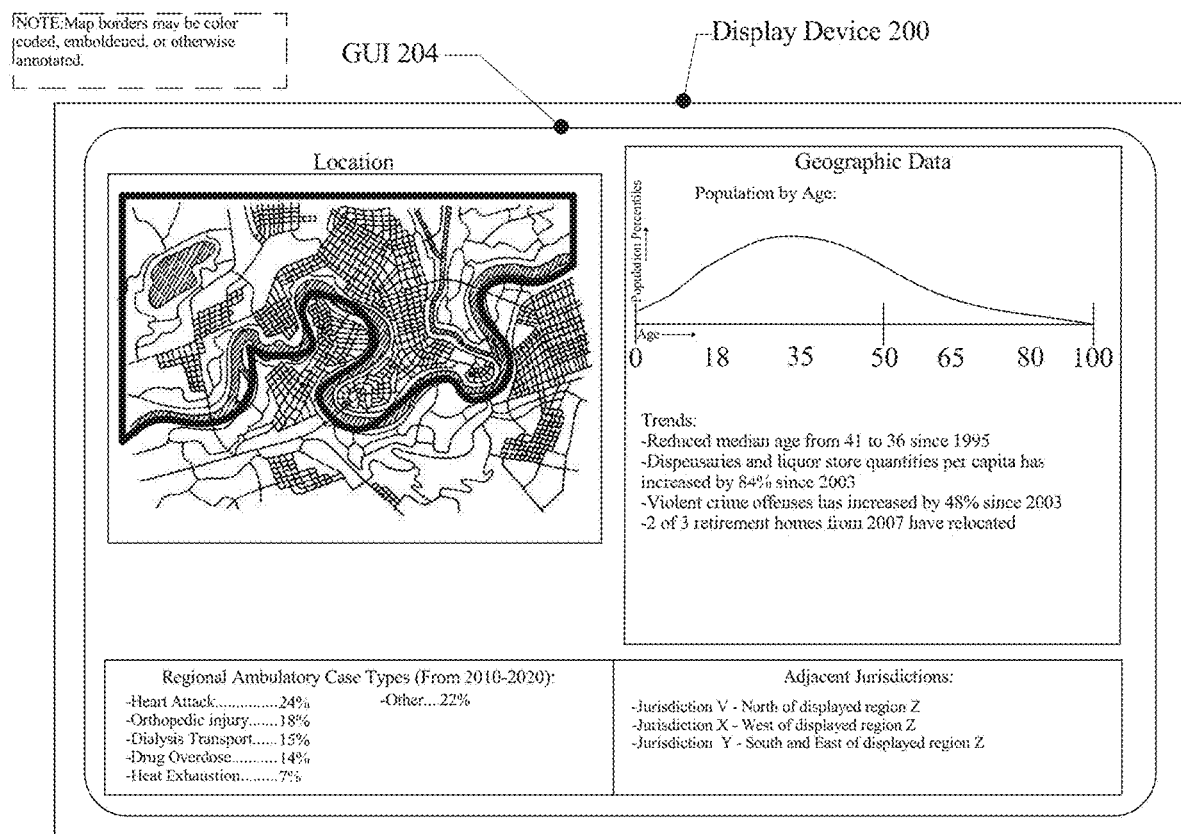
FIG. 2B is an illustration of a separate exemplary embodiment of a graphical user interface.

Referring now to FIG. 2B, a separate exemplary non-limiting embodiment of an illustration of a display device 200 and GUI 204 display is shown. Display device 200, is again shown displaying GUI 204. FIG. 2B, in a non-limiting manner, may show additional data types and formatting options available for modification by a user or organization to optimize their engagement with the apparatus. FIG. 2B exemplifies the ability to highlight and display relevant information as dictated by user engagement and need. As shown in FIG. 2B, user may display the operational jurisdiction in a two-dimensional geographic layout with boundaries highlighted. Use of a map may further enable color-coded regions and even alerts when the mobile device which processor 104 is contained within moves across jurisdictional shifts. Map data may be scraped from internet-based, publicly available information, or may be manually developed and uploaded by user. Where the map data or any other web-sourced information is displayed or used, GUI 204 may enable user to query that source wherein GUI 204 would then display the link or database source the information was retrieved from. User may additionally be interested in the geographic demographic information, such as the population by age and any associated trends in the data over a selectable timeframe. This type of information may be displayed in a window in the top right, as shown in FIG. 2B, but this window may also be used to show other types of geographic based demographics such as a breakdown of the regional causes of death or injury over a specified time period, the rate of contact sports engagements, or recent drug overdoses and related common locations of the overdose victims, or any similar publicly available, or proprietary accessible information able to be configured for display within GUI 204. Collection of this type of information may be achieved at the organizational level, wherein the user's organization may compile and locally store the data for internal use. User may additionally elect to display the common reasons for ambulatory care within the region over a specified time period as shown in the bottom-left window. The displayed regions may be automated to update based on the sensed location of the apparatus, or user may select a region from a list. As shown in the bottom-right window, user may query adjacent jurisdictions, or select any jurisdiction from a comprehensive list of available jurisdiction data. Once selected, GUI 204 may display the new jurisdiction in the same format as the original viewing engagement or may automatically conform the view to the most commonly used, or baseline layout used in the new jurisdiction. All viewing formats may be modified by user to optimize the engagement. In a non-limiting embodiment, this type of use of geo-fenced demographic data may enable user to more accurately estimate ambulatory fleet quantities, hub locations, shift rotation hours, maintenance schedules and make other operational decisions based on reliable historic data. As above, all location-based information displayed may be generated by the location sensing abilities contained within remote device 128 and built by processor 104 based on a compilation of a combination of web-based sources, proprietary generated data, and/or manually input details from the current or past engagements.

Figure 3:
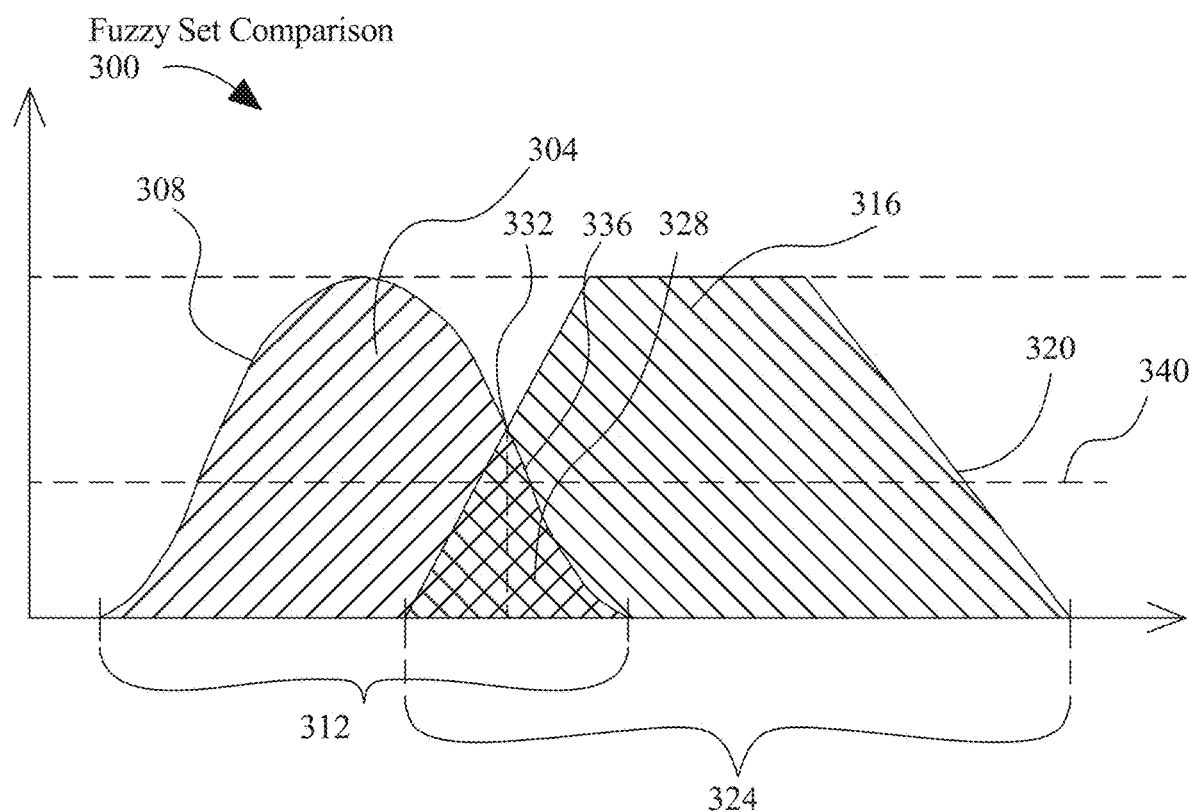
FIG. 3 is a block diagram of an exemplary embodiment of a fuzzy set comparison.

Referring to FIG. 3, an exemplary embodiment of fuzzy set comparison 300 is illustrated. In a non-limiting embodiment, fuzzy sets may be used to analyze and correlate ability data inputs with entity prospect conclusions, as well as analyzing and correlating emergent incident data inputs with incident remediation profile conclusions. A first fuzzy set 304 may be represented, without limitation, according to a first membership function 308 representing a probability that an input falling on a first range of values 312 is a member of the first fuzzy set 304, where first membership function 308 has values on a range of probabilities such as without limitation the interval [0,1], and an area beneath first membership function 308 may represent a set of values within first fuzzy set 304. Although first range of values 312 is illustrated for clarity in this exemplary depiction as a range on a single number line or axis, first range of values 312 may be defined on two or more dimensions, representing, for instance, a Cartesian product between a plurality of ranges, curves, axes, spaces, dimensions, or the like. First membership function 308 may include any suitable function mapping first range 312 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 3, first fuzzy set 304 may represent any value or combination of values as described above, including output from one or more machine-learning models, a predetermined class, such as without limitation a user state (e.g., attentive, inattentive, and the like). A second fuzzy set 316, which may represent any value which may be represented by first fuzzy set 304, may be defined by a second membership function 320 on a second range 324; second range 324 may be identical and/or overlap with first range 312 and/or may be combined with first range 312 via Cartesian product or the like to generate a mapping permitting evaluation overlap of first fuzzy set 304 and second fuzzy set 316. Where first fuzzy set 304 and second fuzzy set 316 have a region 328 that overlaps, first membership function 308 and second membership function 320 may intersect at a point 332 representing a probability, as defined on probability interval, of a match between first fuzzy set 304 and second fuzzy set 316. Alternatively or additionally, a single value of first and/or second fuzzy set may be located at a locus 336 on first range 312 and/or second range 324, where a probability of membership may be taken by evaluation of first membership function 308 and/or second membership function 320 at that range point. A probability at 328 and/or 332 may be compared to a threshold 340 to determine whether a positive match is indicated. Threshold 340 may, in a non-limiting example, represent a degree of match between first fuzzy set 304 and second fuzzy set 316, and/or single values therein with each other or with either set, which is sufficient for purposes of the matching process; for instance, threshold may indicate a sufficient degree of overlap between an output from one or more machine-learning models and/or a biofeedback signal and a predetermined class, such as without limitation a user state, for combination to occur as described above. Alternatively or additionally, each threshold may be tuned by a machine-learning process.

Figure 4:
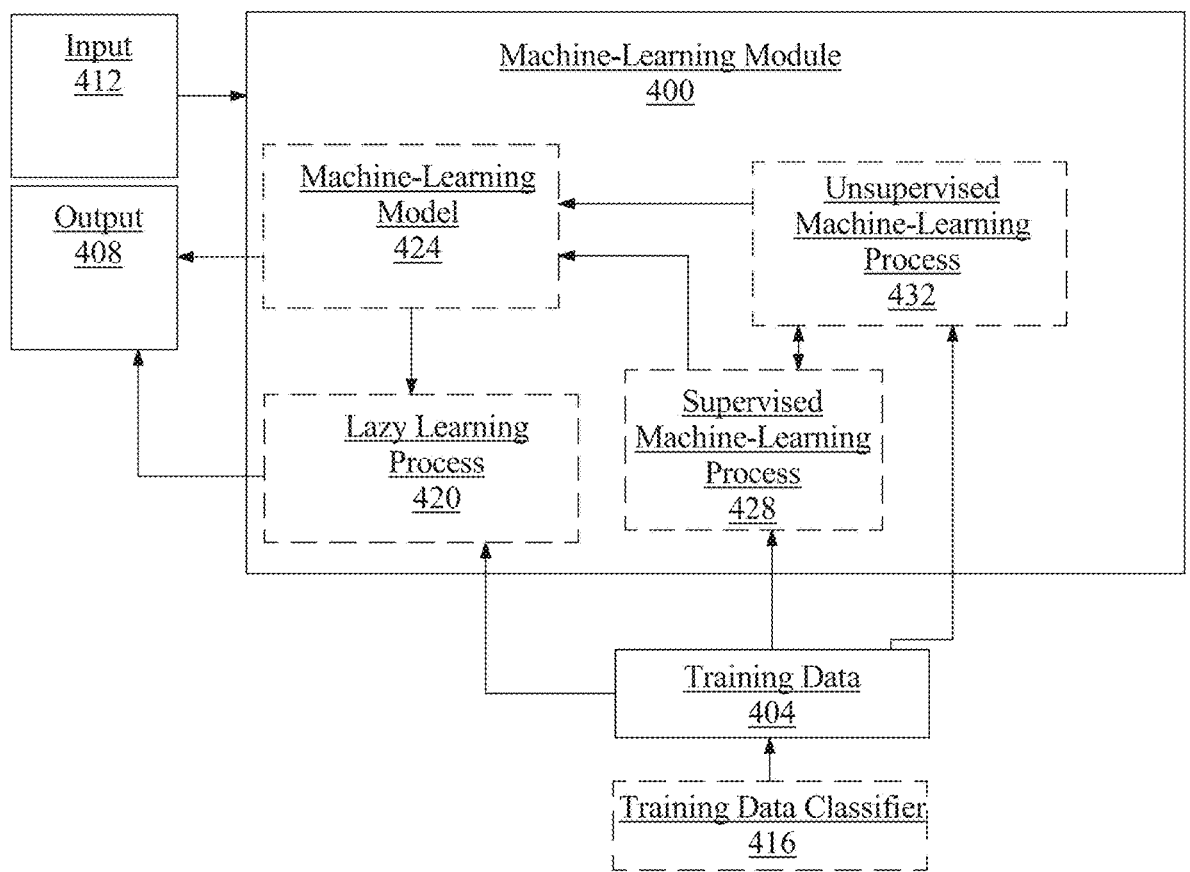
FIG. 4 is a block diagram of an exemplary machine-learning process.

Referring now to FIG. 4, an exemplary embodiment of a machine-learning module 400 that may perform one or more machine-learning processes as described in this disclosure is illustrated. Machine-learning module 400 may perform determinations, classification, and/or analysis steps, methods, processes, or the like as described in this disclosure using machine-learning processes. A "machine-learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine-learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404, also known as "training examples," may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors (KNN) classifiers, support vector machines, least squares support vector machines, fisher's linear discriminant, quadratic classifiers, decision trees, boosted trees, random forest classifiers, learning vector quantization, and/or neural network-based classifiers.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a KNN, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine-learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task LASSO model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Continuing to refer to FIG. 4, machine-learning model 424 may be configured using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and P(B) is the probability of the data regardless of the hypothesis. A naïve Bayes algorithm may be generated by first transforming training data into a frequency table. Processor may then calculate a likelihood table by calculating probabilities of different data entries and classification labels. Processor may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 4, machine-learning model 424 may be configured using a KNN algorithm. A "K-nearest neighbors algorithm" as used in this disclosure, includes a classification method that utilizes feature similarity to analyze how closely out-of-sample features resemble training data to classify input data to one or more clusters and/or categories of features as represented in training data; this may be performed by representing both training data and input data in vector forms, and using one or more measures of vector similarity to identify classifications within training data, and to determine a classification of input data. KNN algorithm may include specifying a K-value determining the most common classifier of the entries in the database and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating KNN algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figure 5:
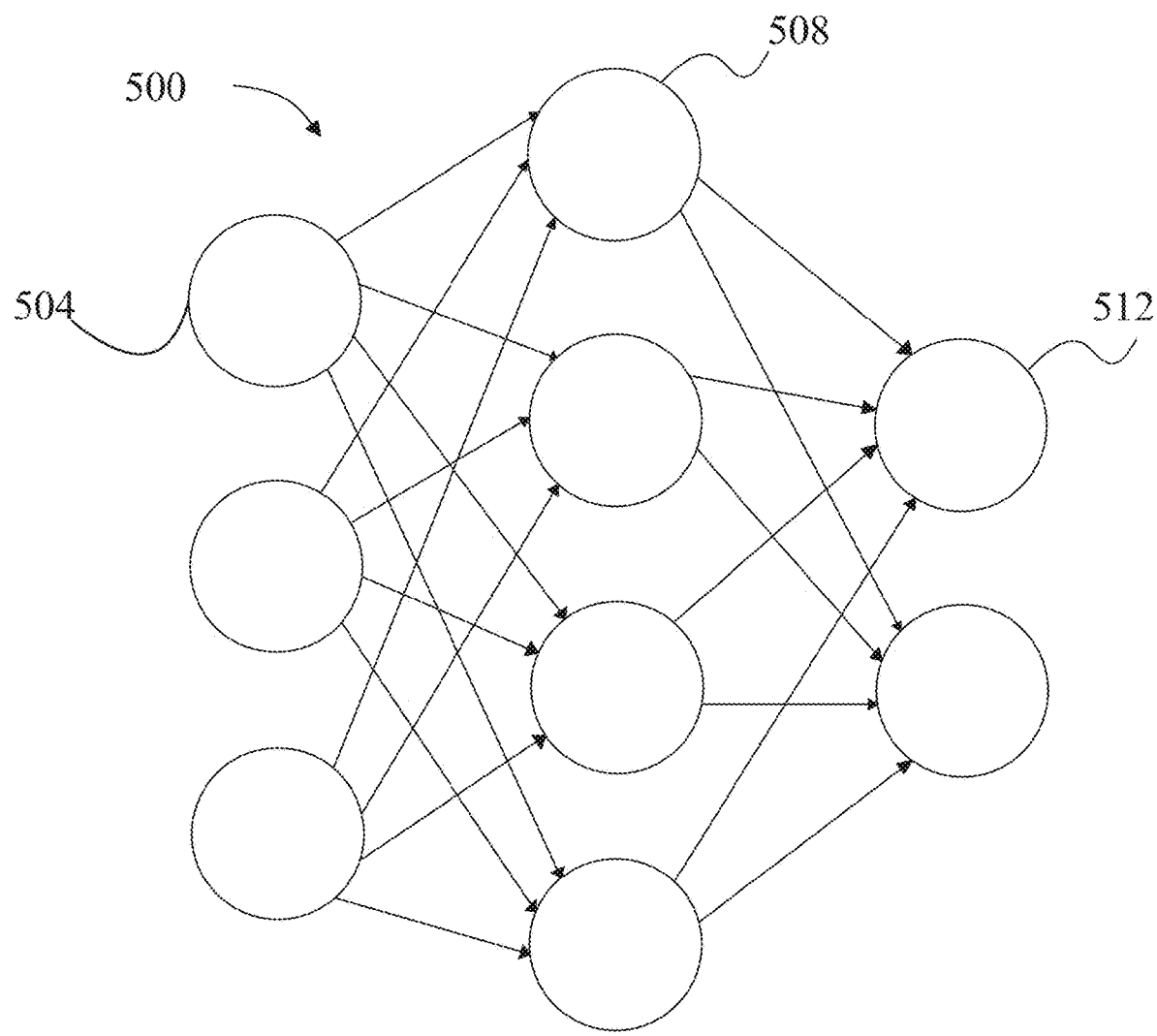
FIG. 5 is a diagram of an exemplary embodiment of a neural network.

Referring now to FIG. 5, an exemplary embodiment of neural network 500 is illustrated. A neural network 500, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

With continued reference to FIG. 5, in a non-limiting embodiment, a neural network may be built around the dozens of simultaneously operational or standby ambulances, hospitals, insurance providers, healthcare administrators, or any other organization holding data that may be relevant either to the specific entity involved or the specific incident being analyzed. Each individual entity may be an input node 504, intermediate node 508, output node 512, or a combination of the three as applicable. In cases where bandwidth or data is limited, the remote devices would be primarily input nodes and the majority of processing by machine-learning model would be done remotely. To optimize system operation, machine-learning model may dictate certain remote devices manage the processing to minimize time expended in the analysis and provide feedback to user as close to real-time as possible.

Figure 6:
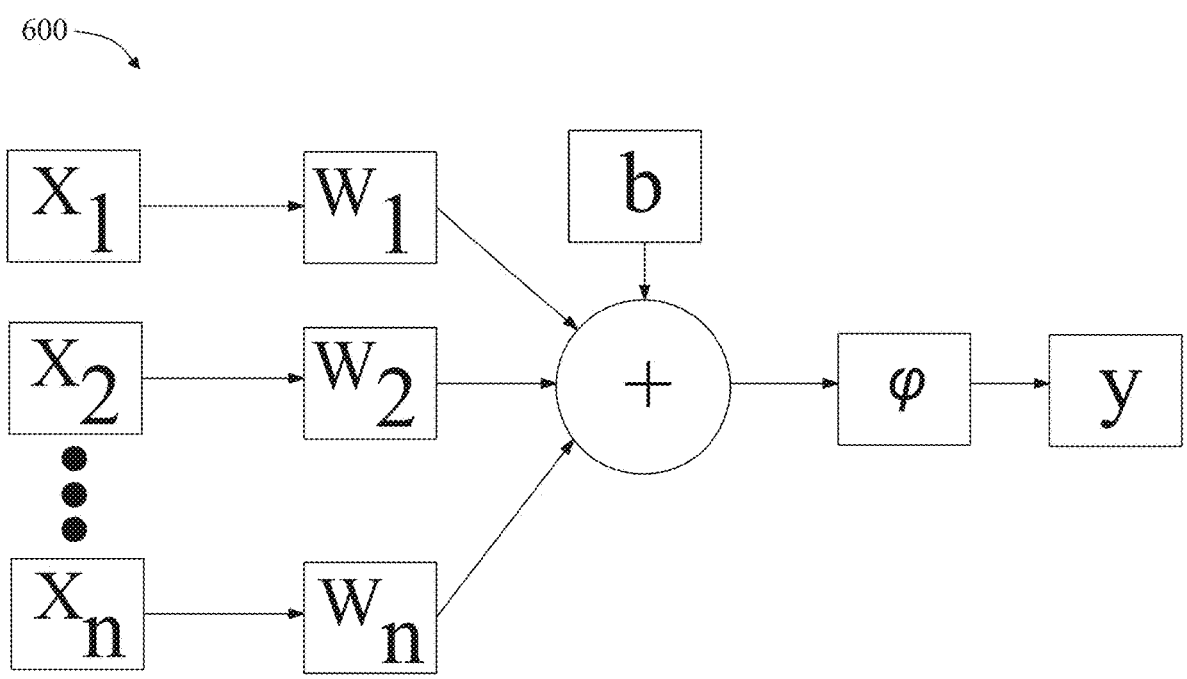
FIG. 6 is a diagram of an exemplary embodiment of a node of a neural network.

Referring now to FIG. 6, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
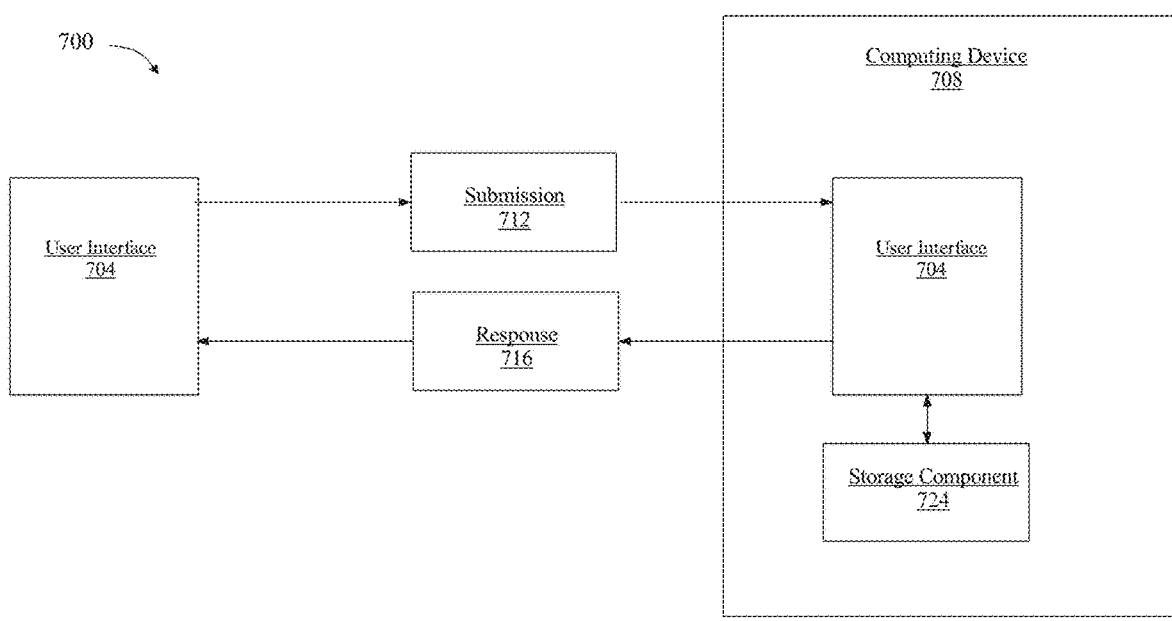
FIG. 7 is an illustration of an exemplary embodiment of a chatbot.

Referring to FIG. 7, a chatbot system 700 is schematically illustrated. According to some embodiments, a user interface 704 may be communicative with a computing device 708 that is configured to operate a chatbot. In some cases, user interface 704 may be local to computing device 708. Alternatively or additionally, in some cases, user interface 704 may remote to computing device 708 and communicative with the computing device 708, by way of one or more networks, such as without limitation the internet. Alternatively or additionally, user interface 704 may communicate with user device 708 using telephonic devices and networks, such as without limitation fax machines, short message service (SMS), or multimedia message service (MMS). Commonly, user interface 704 communicates with computing device 708 using text-based communication, for example without limitation using a character encoding protocol, such as American Standard for Information Interchange (ASCII). Typically, a user interface 704 conversationally interfaces a chatbot, by way of at least a submission 712, from the user interface 708 to the chatbot, and a response 716, from the chatbot to the user interface 704. In many cases, one or both of submission 712 and response 716 are text-based communication. Alternatively or additionally, in some cases, one or both of submission 712 and response 716 are audio-based communication.

Continuing in reference to FIG. 7, a submission 712 once received by computing device 708 operating a chatbot, may be processed by a processor. In some embodiments, processor processes a submission 712 using one or more of keyword recognition, pattern matching, and natural language processing. In some embodiments, processor employs real-time learning with evolutionary algorithms. In some cases, processor may retrieve a pre-prepared response from at least a storage component 720, based upon submission 712. Alternatively or additionally, in some embodiments, processor communicates a response 716 without first receiving a submission 712, thereby initiating conversation. In some cases, processor communicates an inquiry to user interface 704; and the processor is configured to process an answer to the inquiry in a following submission 712 from the user interface 704. In some cases, an answer to an inquiry present within a submission 712 from a user device 704 may be used by computing device 708 as an input to another function.

With continued reference to FIG. 7, chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. Chatbot may then use a decision tree, data base, or other data structure to respond to the user's entry into the chatbot as a function of a chatbot input. As used in the current disclosure, "Chatbot input" is any response that an entity or user inputs into a chatbot as a response to a prompt or question.

With continuing reference to FIG. 7, computing device 708 may be configured to respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 708 may generate two or more decision trees, which may overlap; for instance, a root node of one tree may connect to and/or receive output from one or more terminal nodes of another tree, intermediate nodes of one tree may be shared with another tree, or the like.

Still referring to FIG. 7, computing device 708 may build decision tree by following relational identification; for example, relational indication may specify that a first rule module receives an input from at least a second rule module and generates an output to at least a third rule module, and so forth, which may indicate to computing device 708 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 708 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 7, decision tree may incorporate one or more manually entered or otherwise provided decision criteria. Decision tree may incorporate one or more decision criteria using an API. Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 8:
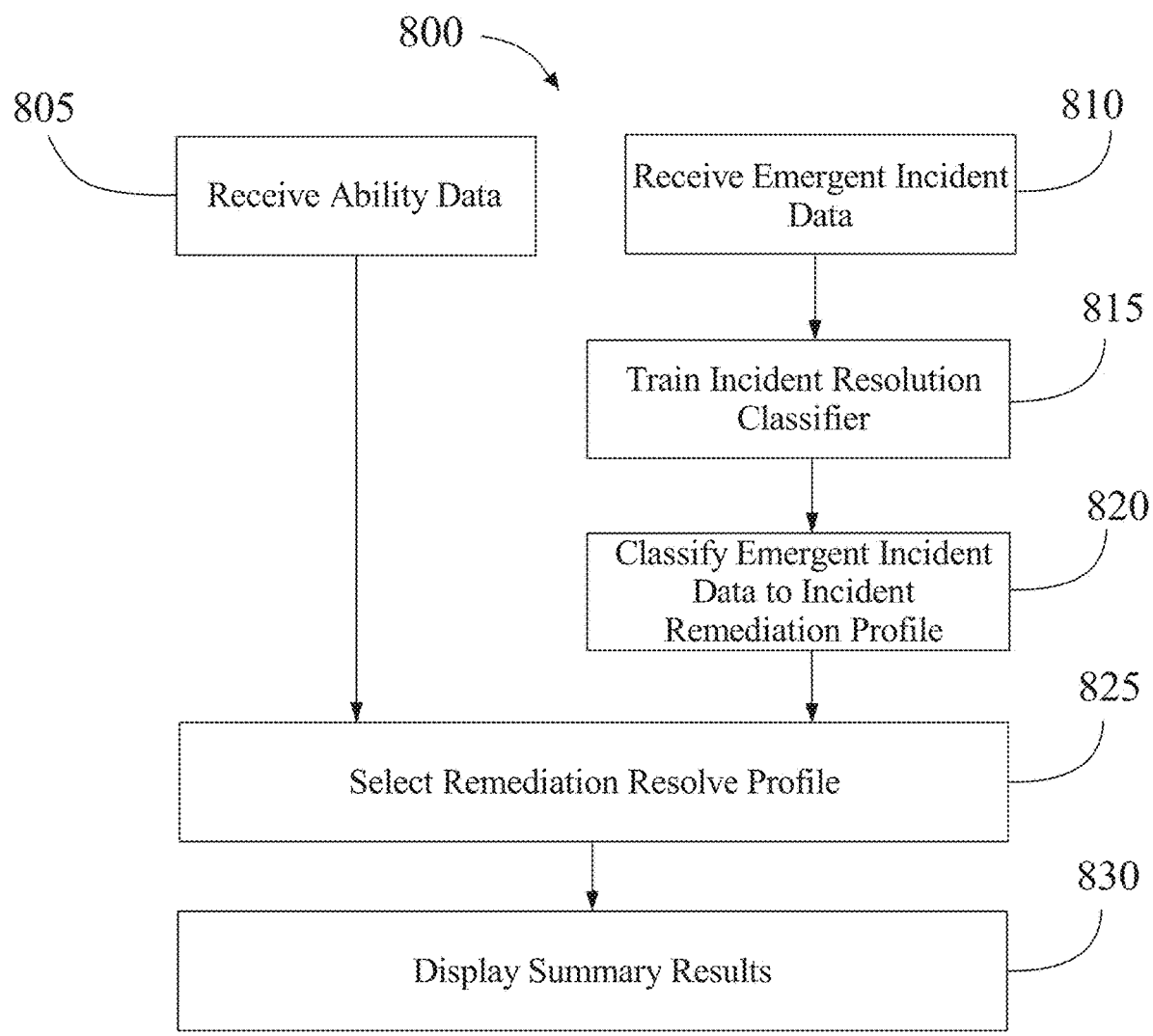
FIG. 8 is a flow diagram of an exemplary method for rapid data retrieval and heuristic processing of limited starting input information.

Referring now to FIG. 8, a flow diagram of an exemplary method 800 for rapid data retrieval and heuristic processing of limited starting input information is illustrated. At step 805, method 800 includes receiving, using at least a processor, ability data relating to an entity associated with an emergent incident, wherein ability data encapsulates all information pertaining to the specific entity's likelihood of carrying out the necessary corrective actions. This may be implemented as described and with reference to FIGS. 1-9. In some embodiments, the ability data may be received from an API and/or a web crawler.

Still referring to FIG. 8, at step 810, method 800 includes receiving, using the at least a processor, emergent incident data, wherein emergent incident data encapsulates all relevant information affiliated with the referenced emergency. This may be implemented as described and with reference to FIGS. 1-9.

Still referring to FIG. 8, at step 815, method 800 includes training, using the at least a processor, an incident resolution classifier using training data correlating emergent incident data examples to emergent incident data responses. This may be implemented as described and with reference to FIGS. 1-9.

Still referring to FIG. 8, at step 820, method 800 includes classifying, using the at least a processor, emergent incident data to a plurality of incident remediation profiles. This may be implemented as described and with reference to FIGS. 1-9.

Still referring to FIG. 8, at step 825, method 800 includes selecting, using the at least a processor, remediation resolve profile. This profile analyzes the likelihood of resolution of emergent incident. Assessing a likelihood of resolution of the emergent incident relies on machine-learning processes to combine ability data and emergent incident data to approximate a probability that the emergent incident will be fully resolved based on the estimated remediation profile. This may be implemented as described and with reference to FIGS. 1-9.

Still referring to FIG. 8, at step 830, method 800 includes displaying, using the at least a processor, a summary of the results to the user. This summary includes the interpolated information, data sources supporting the interpolation, and remediation analyses as applicable. This may be implemented as described and with reference to FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
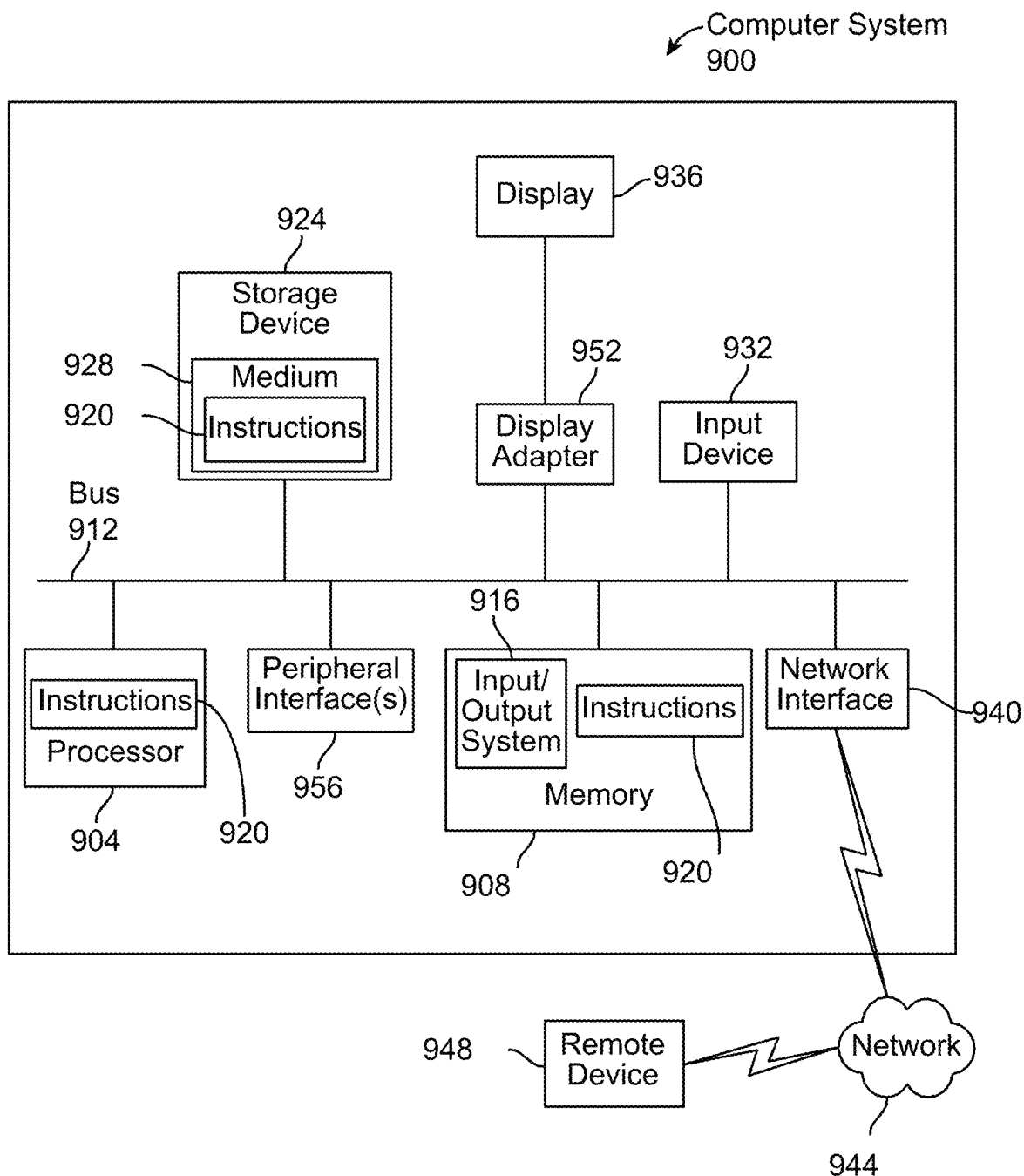
FIG. 9 is a block diagram of a computing system that can be used to implement any one or more of the methodologies disclosed herein and any one or more portions thereof.

Referring now to FIG. 9, a diagrammatic representation of one embodiment of a computing device in the exemplary form of a computer system 900 within which a set of instructions for causing a control system to perform any one or more of the aspects and/or methodologies of the present disclosure may be executed is illustrated. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for rapid data retrieval and heuristic processing of stochastic information, wherein the apparatus comprises:
   at least a processor; and
   a memory digitally connected to the at least a processor, the memory containing instructions configuring the at least a processor to:
      receive a plurality of ability data of an entity and an emergent incident data, wherein the emergent incident data is information aiding in the implementation of a comprehensive corrective action plan;
      classify the emergent incident data to a plurality of incident remediation profiles using an incident resolution classifier, wherein classifying further comprises:
         training the incident resolution classifier using training data correlating emergent incident data examples to emergent incident data responses;
         classifying the emergent incident data to a plurality of incident remediation profiles using the incident resolution classifiers;
         updating the training data with the emergent incident data and at least one incident remediation profile from the classifying of the emergent incident data;
         retraining the incident resolution classifier with the updated training data; and
      selecting a remediation resolve profile from the plurality of incident remediation profiles using the ability data; and
      display a summary of remediation resolve profile for a user.

2. The apparatus of claim 1, wherein ability data comprises data characterizing entity's capacity and control of resources in relation to an ability to address remediation resolve profile.

3. The apparatus of claim 1, wherein receiving the ability data comprises receiving the ability data using an application programming interface (API).

4. The apparatus of claim 1, wherein receiving the ability data comprises receiving the ability data using a web crawler.

5. The apparatus of claim 1, wherein receiving the ability data comprises receiving the ability data from a database.

6. The apparatus of claim 1, wherein receiving the emergent incident data comprises receiving the emergent incident data using an API.

7. The apparatus of claim 1, wherein receiving the ability data and the emergent incident data comprises using a machine-learning model to populate any incomplete data based on heuristic schemes.

8. The apparatus of claim 1, wherein generating the incident remediation profile comprises using a machine-learning model to anticipate the remedial measures to be expected based on the type of incident and specific incident data.

9. The apparatus of claim 1, wherein generating the remediation resolve profile comprises using a machine-learning model to analyze both the entity and ability data and the incident remediation profile to appraise a likelihood of a comprehensive satisfactory resolution based on a range of probabilistic, entity-specific measures.

10. The apparatus of claim 9, wherein the machine-learning process may ingest training data from historical events, a database, or direct user feedback to improve the machine-learning model.

11. A method for rapid data retrieval and heuristic processing of stochastic information, wherein the method comprises:
   receiving, by the at least a processor, ability and emergent incident data, wherein the emergent incident data is information aiding in the implementation of a comprehensive corrective action plan;
   classifying, by the at least a processor, the emergent incident data to a plurality of incident remediation profiles, using an incident resolution classifier, wherein classifying comprises:
      training, by the at least a processor, the incident resolution classifier using training data correlating emergent incident data examples to emergent incident data responses;
      classifying the emergent incident data to a plurality of incident remediation profiles using the incident resolution classifiers;
      updating the training data with the emergent incident data and at least one incident remediation profile from the classifying of the emergent incident data;
      retraining the incident resolution classifier with the updated training data;
   selecting, by the at least a processor, a remediation resolve profile from the plurality of incident remediation profiles using the ability data; and
   displaying, by the at least a processor, a summary of results for a user.

12. The method of claim 11, wherein receiving the ability data comprises receiving data characterizing entity's capacity and control of resources in relation to an ability to address remediation resolve profile.

13. The method of claim 11, wherein receiving the ability data comprises receiving the ability data using an application programming interface (API).

14. The method of claim 11, wherein receiving the ability data comprises receiving the ability data using a web crawler.

15. The method of claim 11, wherein receiving the ability data comprises receiving the ability data from a database.

16. The method of claim 11, wherein receiving the emergent incident data comprises receiving the emergent incident data using an API.

17. The method of claim 11, wherein receiving the ability data and the emergent incident data comprises using a machine-learning model to populate any incomplete data based on heuristic schemes.

18. The method of claim 11, wherein generating the incident remediation profile comprises using a machine-learning model to anticipate the remedial measures to be expected based on the type of incident and specific incident data.

19. The method of claim 11, wherein generating the remediation resolve profile comprises using a machine-learning model to analyze the entity and ability data and the incident remediation profile to appraise the likelihood of a comprehensive satisfactory resolution based on a range of probabilistic, entity-specific courses.

20. The method of claim 19, wherein the machine-learning process may ingest training data from historical events, a database, or direct user feedback to improve the machine-learning model.

\* \* \* \* \*